Patented Mar. 11, 1947

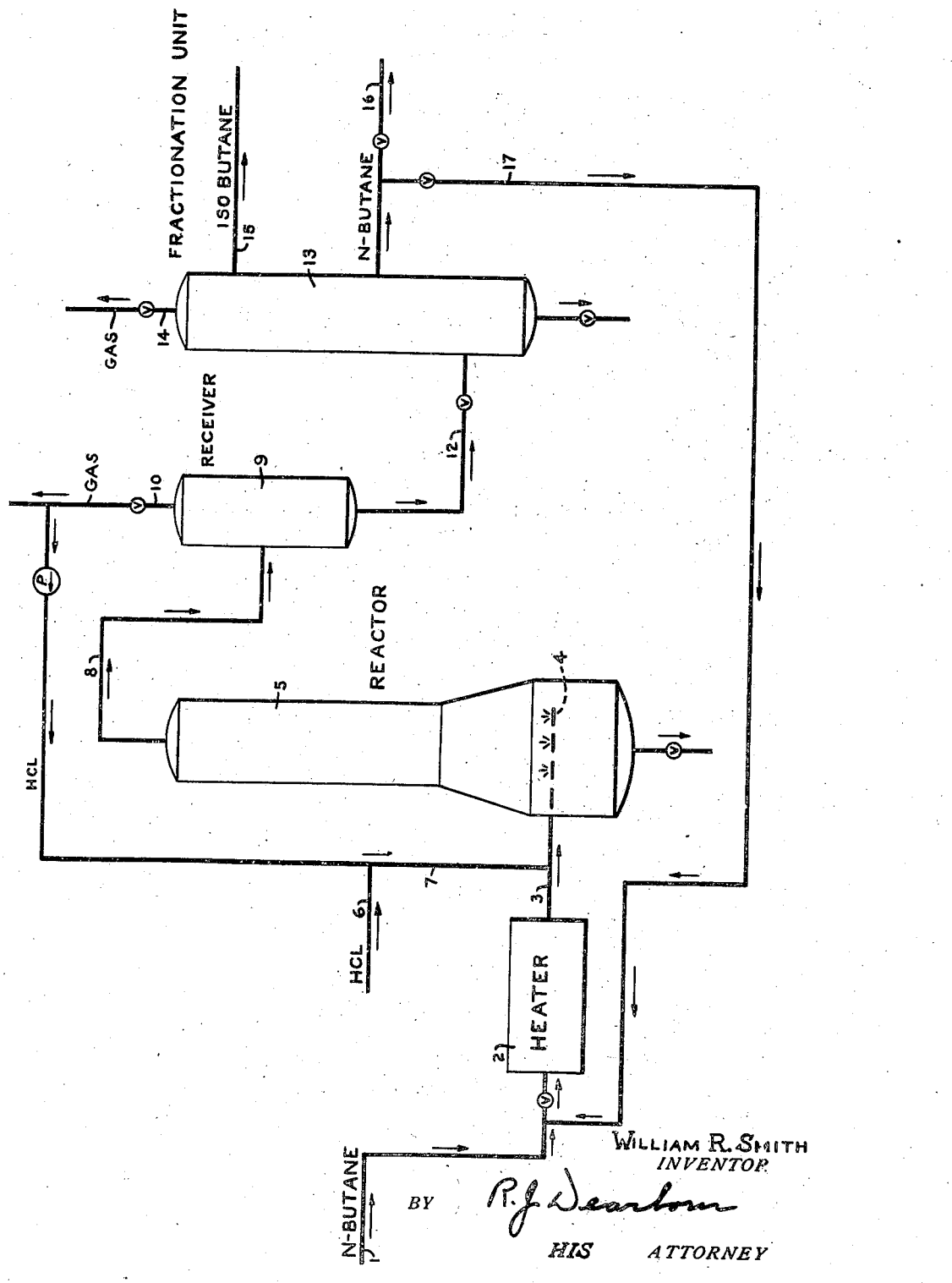

2,417,221

UNITED STATES PATENT OFFICE 2,417,221

CATALYTIC ISOMERIZATION

William R. Smith, Port Arthur, Tex., assignor to The Texas Company, New York, N. Y., a corporation of Delaware Application January 11, 1946, Serial No. 640,584

9 Claims. (Cl. 260—683.5)

This invention relates to the conversion of hydrocarbons. It has to do with the isomerization of hydrocarbons to form branched chain hydrocarbons. It is applicable particularly with respect to the isomerization of normal butane and saturated gasoline hydrocarbons.

The invention has to do with effecting conversion of the hydrocarbons by the action of an active metallic halide catalyst in fluid form and in the presence of hydrogen halide wherein the hydrocarbons undergoing conversion are passed in dispersed phase through a body of the catalyst maintained in substantially continuous liquid phase.

This is a continuation-in-part of my copending application Serial No. 448,728, filed June 27, 1942.

In the copending application of John R. Callaway, Serial No. 488,811, filed May 28, 1943, which is a continuation-in-part of Serial No. 345,025, filed July 12, 1940, there is disclosed and claimed a continuous process for isomerizing normal butane by dispersing the normal butane feed into the lower portion of a substantially static column of liquid isomerization catalyst consisting essentially of aluminum chloride-hydrocarbon complex formed by reacting aluminum chloride with feed hydrocarbons consisting essentially of saturated $C_4$ hydrocarbons in the presence of a small amount of hydrogen chloride at a temperature in the range about 160 to 240° F., the complex catalyst being substantially saturated with aluminum chloride but substantially free from suspended solid aluminum chloride, the dispersed normal butane feed rising in discontinuous phase upwardly through the column of liquid catalyst in continuous phase by differences in density in the presence of a small amount of hydrogen chloride and at an effective isomerization temperature not exceeding about 240° F., whereby the dispersed hydrocarbons are maintained in contact with the catalyst for a period of time not in excess of about ten minutes so that a substantial conversion of normal butane to isobutane takes place in a single passage of feed hydrocarbons through the catalyst column.

The present application relates to this continuous tower type of normal butane isomerization, and is predicated on the discovery that by maintaining the complex liquid catalyst, formed by reacting a Friedel-Crafts metallic halide such as aluminum halide, with hydrocarbons which are substantially free from aromatic constituents, within a critical heat of hydrolysis range, effective conversion of the normal butane to isobutane in once-through operation is secured while at the same time carryover of the metallic halide in solution in the effluent isomate stream discharging from the reaction tower is effectively avoided. In order to maintain the desired level of complex liquid within the reaction tower, a small proportion of the complex liquid is withdrawn either continuously or intermittently; and to maintain the activity of the complex liquid within the reaction zone over long periods of continuous operation, additional metallic halide is added either continuously or intermittently in an amount so regulated that the complex liquid within the reaction zone is kept within the aforementioned critical heat of hydrolysis range.

In accordance with the invention hydrocarbons undergoing conversion are dispersed in finely divided form, such as small droplets or particles and caused to rise in that form through a comparatively stationary or quiescent body of liquid catalyst maintained within a reaction zone, the volume of catalyst within the reaction zone being relatively large with respect to the volume of hydrocarbons passing through the catalyst body. The hydrocarbon reaction products are continuously withdrawn from the top of the reaction zone and provision may be made for the recycling of unconverted hydrocarbons to the reaction.

The invention has particular application to the conversion of a low-boiling paraffin such as normal butane. In applying the invention to the isomerization of normal butane a particularly effective catalyst consists essentially of a liquid complex compound of aluminum halide and petroleum hydrocarbon which is substantially free from suspended solid aluminum halide. It is, therefore, of such character that upon centrifuging at normal room temperature substantially no sediment or sludge is obtained.

It has been proposed heretofore to employ catalysts comprising solid aluminum halide or comprising mixtures of solid aluminum halide and complex compounds of aluminum halide and hydrocarbon. The present invention, however, contemplates effecting isomerization of a saturated hydrocarbon such as normal butane with a liquid catalyst consisting essentially of metallic halide-hydrocarbon complex which is substantially free from undissolved solid aluminum halide. For example, an effective catalyst in accordance with this invention consists of a liquid complex compound of aluminum chloride and hydrocarbon of such character that it has an apparent heat of hydrolysis within the range from substantially above 200 calories per gram of complex to about 320 calories per gram of complex, equivalent to an absolute heat of hydrolysis from substantially above about 213 to about 341 calories per gram of complex. By "apparent" heat of hydrolysis is meant the calculated value of the heat liberated when a minor portion of the complex is mixed with a major portion of water, the calculation being based upon the rise in temperature of the amount of water used in the calorimeter. By "absolute" heat of hydrolysis is meant the calculated figure obtained from the said apparent heat of hydrolysis by adding a certain percentage correction to compensate for the heat absorbed by the calorimeter apparatus itself, as determined by a calibration of the calorimeter employed.

The heat liberated in this calorimeter test is the total of at least three principal effects: 1. The heat of hydrolysis of the aluminum chloride hydrocarbon complex. 2. The heat of solution in water of any solid aluminum chloride present; and, 3. The heat obtained when aluminum chloride that is dissolved in the complex comes in contact with water and preferentially dissolves in the latter medium.

A complex prepared by treating an excess of aluminum halide with hydrocarbon such as kerosine and which is free from solids that would be separated by centrifuging the prepared complex at 3000 revolutions per minute for a half hour in an A. P. I. centrifuge at about normal room temperature, usually evolves an apparent or measurable heat not in excess of about 320 calories per gram of complex upon mixing with water as described. Such a complex is particularly suitable as a catalyst for isomerizing normal butane, is either gas or liquid phase. When applying the percentage correction for the amount of heat liberated which is absorbed by the calorimeter, then the absolute heat of hydrolysis of the aforesaid complex calculates to about 341 calories per gram of complex.

The aluminum chloride content of a complex catalyst may vary considerably depending, for example, upon the hydrocarbons used in forming the complex. Irrespective of this, however, the foregoing apparent heat value of about 300 to 320, with an absolute heat value of about 320 to 341, seems to hold for a complex catalyst mixture saturated with aluminum chloride but free from solids which would appear as a sediment upon centrifuging as above described.

The presence of excess solid aluminum halide in the complex, such as is evidenced by the obtaining of a substantial sediment upon centrifuging, appears undesirable when isomerizing normal butane because it apparently causes some cracking or other side reactions to occur, and results in aluminum halide carryover in the effluent isomate stream.

In practicing the invention normal butane is subjected to contact with the liquid complex catalyst in the presence of hydrogen chloride at a temperature not in excess of about 300° F. and preferably at a temperature about 180 to 240° F. with a short period of contact. This time of contact may range from several seconds to several minutes or more depending upon the temperature maintained. By employing a complex catalyst having an apparent heat value of not more than 300 to 320 calories, equivalent to an absolute heat value of about 320 to 341 calories, a prolonged period of contact between butane and the catalyst can be maintained apparently without side reactions occurring at temperatures in the range up to as high as 215 to 220° F.

Continuous flow of hydrocarbon in dispersed phase through the body of complex catalyst may be continued substantially indefinitely by providing for the addition of small amounts of aluminum halide intermittently or continuously coupled with withdrawal of a small amount of spent or used complex as will hereinafter be described. The amount of solid aluminum halide so added to the reaction zone is such that the complex is substantially free from undissolved solid aluminum halide.

The feed hydrocarbon is passed in dispersed liquid phase through a comparatively stationary body of liquid catalyst by difference in density and the volume of liquid catalyst is maintained large relative to the volume of hydrocarbons undergoing conversion within the reaction zone. It appears that by maintaining the liquid catalyst in continuous phase and the hydrocarbons undergoing conversion in dispersed phase, highly effective contact between hydrocarbon and catalyst is secured. Under these conditions the surface between feed hydrocarbon particles and the catalyst is continually distorted and broken down in a more effective manner, thereby insuring more efficient contact between hydrocarbon and catalyst.

Notwithstanding the fact that under ordinary circumstances aluminum halide is soluble in butane to a substantial extent at the temperatures employed, it has been discovered that the liquid butane during passage through a complex catalyst of the above-described character apparently does not dissolve and extract aluminum halide from the liquid catalyst body and carry it out of the reaction zone. When liquefied normal butane flows through a contact mass of solid aluminum halide, a substantial amount of the halide is dissolved in the butane and is removed as solute in the effluent hydrocarbon. By contrast, when operating in accordance with the present invention employing a liquid catalyst as already described the stream of hydrocarbon liquid leaving the reaction zone is substantially free from aluminum halide.

Maintaining substantially unidirectional flow of the hydrocarbons undergoing conversion through the liquid catalyst body apparently facilitates the rapid removal of converted hydrocarbon from the catalyst so that there is less tendency for overexposure of the resulting isoparaffin to the catalyst than is the case in a highly agitated reactor wherein portions of isoparaffin may remain in the catalyst or in contact with the catalyst for an excessive period of time.

The operation is preferably carried out by passing the feed hydrocarbon in highly dispersed state upwardly through a tower filled with the liquid catalyst and entirely free from agitation produced by a stirring mechanism so that substantial coalescence of the hydrocarbon dispersion is avoided. Liquid hydrocarbon feed may be introduced through a spray or jets placed in a Venturi section at the bottom of the tower. The tower may be either an unpacked tower free from obstructions, or it may contain a suitable inert packing material for a certain portion of its height, such as small contact pieces, each shaped to simulate a saddle and known to the trade as "Berl saddles." It will be understood that such a packing merely increases the length of the path of flow of the dispersed droplets without causing substantial coalescence thereof, and while maintaining the static condition of the column of complex liquid within the tower.

In short, by employing the catalyst of this invention and by operating in the manner already described a highly uniform and selective catalytic action is realized whereby a high yield of isobutane is produced from normal butane without substantial formation of decomposition products either of lower or higher molecular weight than butane. In addition, the activity of the catalyst is maintained at a uniformly high level over prolonged periods of time, while carry-over of aluminum halide in solution in the effluent isomate stream is avoided.

In order to describe the method of practicing the invention, reference will now be made to the accompanying drawing.

As shown in the drawing a feed hydrocarbon consisting essentially of normal butane is drawn from a source not shown through a pipe 1 and conducted to a heater 2 wherein the hydrocarbon is heated to a reaction temperature of about 210° F.

The heated hydrocarbon stream is passed from the heater through a pipe communicating with a spray discharge 4 located in the Venturi portion of a vertical reaction tower 5. The sprays should discharge the feed particles without substantial impingement upon the sloping sides of the tower.

The reaction tower comprises a vertical vessel filled or substantially filled with a large body of liquid complex catalyst to which reference will be made later.

Hydrogen chloride may be drawn from a source not shown through a pipe 6 communicating with a pipe 7 through which hydrogen chloride is introduced to the stream of heated feed hydrocarbon flowing through the pipe 3. The amount of hydrogen chloride injected in the feed hydrocarbon stream may vary from a fraction of a per cent to 4 or 5 per cent but usually amounts to about 2 or 3 per cent by weight of the feed hydrocarbon introduced to the reaction zone.

The catalyst body within the reactor is maintained at the reaction temperature. The temperature may be maintained by adjusting the temperature of the entering feed and also by jacketing the tower. Since the reaction is slightly exothermic it may be necessary to extract some of the heat of the reaction, although it is contemplated that the temperature may be allowed to rise so as to actually maintain a temperature gradient of 20 to 50° F. in the direction of hydrocarbon flow through the catalyst.

The volume of liquid catalyst maintained within the reactor 5 and the rate of introduction of feed hydrocarbons may be adjusted so as to maintain the volume of liquid catalyst in excess of that of the feed hydrocarbon within the reactor, and preferably in the proportion of about 2 to 100 volumes per volume of feed hydrocarbon within the reactor at any given instant.

Advantageously sufficient pressure is maintained within the reactor 5 so that the feed hydrocarbon remains in the liquid phase. For example, in the case of normal butane the pressure may be about 335 to 350 pounds with a reaction temperature of 210° F. The feed hydrocarbon is dispersed in droplets by means of the discharge spray 4 and the droplets or particles rise through the comparatively stationary body of catalyst liquid by difference in density.

The time of contact between the hydrocarbons and the catalyst may be altered by varying the depth of liquid catalyst through which the hydrocarbon particles rise. Thus, the time of contact may be prolonged by passing the hydrocarbon through an elongated vertical reaction zone filled with the complex catalyst. For example, the depth of liquid catalyst may range from a few feet to about 15 or 20 feet and may be as high as 40 feet. Within certain limits the shorter the time of contact the higher may be the reaction temperature maintained without obtaining undesired side reactions. Relatively low temperatures favor realizing a higher equilibrium concentration of isobutane in the hydrocarbon reaction products.

It is desirable that the spray or sprays for introducing the feed to the bottom of the reaction tower be so arranged and of such design as to introduce the feed hydrocarbon in a uniform dispersion of fine droplets or particles extending over the entire cross-sectional area of the tower, as disclosed and claimed in the copending application of Lynn R. Strawn, Serial No. 483,440, filed April 17, 1943, now Patent No. 2,389,651, dated November 27, 1945. The rate of feed introduction should be controlled so as to avoid displacement of liquid catalyst from the tower and also so as to avoid channelling of the hydrocarbons flowing through the catalyst. It is desirable to have the hydrocarbons remain as discrete particles during passage through the liquid catalyst. Therefore, conditions should be controlled so as to avoid substantial coalescence of the individual particles during passage through the catalyst.

The reacted and unreacted hydrocarbons are continuously drawn off in a stream from the top of the reactor through a pipe 8 through which they are conducted to a receiver or other vessel 9. The pressure may be released in part in the receiver 9 to permit gaseous constituents to escape through a pipe 10. Such gas may comprise mainly hydrogen chloride which is advantageously recycled, as indicated, to the reactor.

The hydrocarbons are conducted from the receiver 9 through a pipe 12 to a fractionating unit 13 which may comprise one or more fractionating towers so as to effect any desired degree of fractionation of the hydrocarbon mixture.

For example, a gaseous fraction comprising hydrogen chloride may be removed and discharged through a pipe 14 for recycling to the reactor 5 or for such other disposition as may be desired. A fraction comprising isobutane is drawn off through a pipe 15 while another stream comprising unreacted normal butane is drawn off through a pipe 16. The unreacted normal butane may be recycled all or in part through a pipe 17 to the previously-mentioned pipe 1 through which it is returned to the system for further conversion.

The preformed catalyst complex may be prepared by reacting aluminum halide with a petroleum hydrocarbon or hydrocarbon mixture in the presence of hydrogen chloride. For example, 1000 parts by weight of anhydrous aluminum chloride powder is mixed with about 1630 parts by weight of kerosine derived from mixed base crude and having the following approximate characteristics:

| | |
|---|---|
| A. P. I. gravity | 43 |
| Saybolt thermo-viscosity at 60° | 370 |
| Initial boiling point | °F__ 347 |
| 20% point | °F__ 388 |
| 50% point | °F__ 415 |
| 90% point | °F__ 470 |
| End boiling point | °F__ 490 |

The foregoing mixture together with 50 parts by weight of hydrogen chloride is charged to a closed reactor and agitated for about 4 hours at a temperature of about 210° F. The reaction mixture is thereafter cooled and the contents removed and separated into phases. The complex phase is removed from the hydrocarbon phase and this complex comprises the preformed liquid catalyst.

It is of such character that when a minor portion thereof is mixed with a major portion of water the heat evolved from the mixture is within the effective isomerization activity range which avoids catalyst carryover by solution in the effluent isomate stream as set forth above. The heat of the mixture is determined, for example, by breaking an ampoule containing a weighed amount of complex, i. e., about 3 grams in a weighed quantity of water, i. e., about 300 grams, contained in a Thermos flask and initially at about normal room temperature. The mixture is stirred and the rise in temperature measured by means of a thermometer. From this the apparent heat liberated is calculated as calories per gram of complex. Since the foregoing calculation is based upon the amount of water employed in the Thermos flask or calorimeter used in the test, it is obvious that this apparent value does not include that portion of the heat liberated which is absorbed by the calorimeter itself. In order to make the test reproducible for different laboratories employing different calorimeters, the apparent heat of hydrolysis value as obtained above is converted to an absolute heat of hydrolysis value, so that any variation between different calorimeters is excluded from the absolute value reported. This is accomplished by calibrating the particular calorimeter used for determining the apparent heat of hydrolysis value. The calibration is preferably accomplished by diluting the same weight of water in the calorimeter, namely, about 300 grams, with known weights of sulfuric acid, and calculating the water equivalents of the system using the Bronsted, Grau and Roth data for heat of dilution as reported by Bechowsky and Rossini in "The Thermo Chemistry of the Chemical Substances," published by Reinhold, 1936. The difference between the known values for the heat of dilution of the known weights of sulfuric acid employed and the values calculated from the rise in temperature of the water used in the calorimeter represents the amount of heat absorbed by the calorimeter itself. From the fundamental formula $$\frac{W \times \Delta T}{S}$$

where W is the water equivalent of the system and equals the grams of water placed in the apparatus plus water equivalent of the apparatus itself, $\Delta T$ is the temperature rise in degrees centigrade and S is grams of sample, it is obvious that the correction to be applied to the apparent heat of hydrolysis will vary directly in accordance with the heat liberated, and will therefore be a definite or fixed percentage of the apparent heat of hydrolysis value. A calibration of standard calorimeters employed in this work has shown that the percentage correction to be added to the apparent heat of hydrolysis value is approximately 6.6%. Consequently, the apparent heat of hydrolysis range from substantially above 200 to about 320 calories per gram of complex calculates to an absolute heat of hydrolysis range from substantially above 213 to about 341 calories per gram of complex.

By way of specific example, a stream of normal butane containing about 3% hydrogen chloride by weight of the normal butane was heated to a temperature of 210° F. under a pressure of about 335 to 350 pounds per square inch gauge. The heated stream of normal butane was introduced to the lower portion of a reaction tower, 15 feet in height, filled with liquid aluminum chloride-kerosine complex prepared as described above. In this instance the preformed complex was of such character that when a minor portion thereof was mixed with a major portion of water the apparent heat liberated was about 300 calories per gram of complex, equivalent to an absolute heat of hydrolysis of 320. The rate of normal butane charged to the tower and the volume of liquid complex within the tower was such that the volume ratio of liquid complex to liquid butane within the tower was about 4:1.

The stream of normal butane was passed through the complex catalyst for a period of about 430 hours, obtaining a total yield of isobutane amounting to about 135 pounds per pound of aluminum chloride actually contained in the preformed complex. During this period of operation the effluent hydrocarbons contained 50% isobutane, the remainder consisting essentially of unreacted normal butane.

During prolonged continuous operation, some of the dissolved aluminum halide in the complex liquid apparently reacts with the hydrocarbon, with the result that additional complex liquid is formed and the volume of complex liquid within the tower thus tends to increase. At the same time, the heat of hydrolysis value of the catalyst tends to drop with a consequent reduction in the isomerization activity level of the catalyst. For this reason means are provided for the withdrawal of a small amount of catalyst mixture from the bottom of the reaction tower either intermittently or continuously to maintain the desired complex liquid level within the tower, and also for the controlled addition of a small amount of aluminum halide to the catalyst body to maintain the activity of the catalyst within the effective conversion range. Such addition may be at intervals or continuously. For example such makeup aluminum halide may be dissolved in a small portion of the feed hydrocarbon and injected directly to the reaction tower. On the other hand a portion of the withdrawn catalyst mixture may have additional aluminum halide incorporated therein and thereafter be returned to the reaction tower. In any case the amount of aluminum halide so added to the catalyst is adjusted so that the character of the catalyst body within the reaction tower will remain within the critical limits of heat of hydrolysis as previously described.

While mention has been made of aluminum chloride in preparing the complex, nevertheless it is contemplated that other metallic halides including aluminum bromide, may be employed. It is also contemplated that the reaction may be carried out in the presence of hydrogen, hydrogen containing gases or other agents adapted to modify the reaction so desired. Likewise it is contemplated that temperature conditions and pressure conditions other than those specified above may be employed depending upon the nature of the hydrocarbon feed and the extent of conversion desired.

In preparing the complex other petroleum hydrocarbons besides kerosine hydrocarbons may be used including gasoline hydrocarbons. Aliphatic hydrocarbons in general are preferred.

While mention has already been made of employing from 2 to 100 volumes of liquid catalyst per volume of hydrocarbon within the tower, nevertheless it is contemplated that substantially less than 2 volumes of catalyst may be employed. It is considered desirable when operating with the feed hydrocarbon maintained in the liquid phase to maintain conditions such that the hydrocarbon hold-up in the tower does not exceed a value in the range about 10 to 75% by volume of the liquid catalyst.

It is desirable to avoid excessive holdup so as to keep the tower below the flooding point. At the flooding point the velocity of drop flow is substantially reduced and may be only about one-half the velocity at just below this point. As the flooding point is approached the rising dispersed phase droplets approach a condition of flow characteristic of a close-packed drop column extending throughout the tower above the Venturi section.

A high drop velocity without drop coalescence is desirable particularly with respect to obtaining a high conversion yield to isoparaffin without substantial occurrence of side reactions which might otherwise occur under the prevailing conditions of catalyst activity and reaction temperature. For example, a suitable drop velocity may range from about 0.1 to 0.2 or 0.5 feet per second.

It is also contemplated applying the invention to the treatment of other hydrocarbons besides normal butane. For example, other hydrocarbons may include pentane, hexane and the like. When isomerizing normal pentane a somewhat lower reaction temperature is desirable, as for example, a temperature of about 150° F. Likewise, when isomerizing a feed hydrocarbon consisting essentially of normal hexane a still lower temperature such as about 100° F. is desirable. In the case of a hexane cut or fraction containing naphthene hydrocarbons substantially higher temperatures are usually required and in such case the temperaure may be as high as 250° F.

Provision may also be included for purifying the feed hydrocarbons prior to conversion. Such purification may involve the removal of olefinic and aromatic constituents as well as water and sulfur compounds or other materials which tend to poison or cause deterioration of the catalyst.

Obviously many modifications and variations of the invention as hereinbefore set forth may be made without departing from the spirit and scope thereof, and therefore only such limitations should be imposed as are indicated in the appended claims.

I claim:

1. A continuous method of isomerizing saturated hydrocarbons which comprises maintaining within a vertical reaction zone a substantially static column of liquid catalyst consisting essentially of complex formed by reacting a Friedel-Crafts metallic halide in the presence of hydrogen halide with hydrocarbons which are substantially free from aromatic constituents, continuously introducing saturated feed hydrocarbon to the lower portion of said zone, passing the introduced hydrocarbons comprising $C_4$ hydrocarbons in dispersed liquid phase upwardly through the liquid column by difference in density in the presence of a small amount of hydrogen halide at an elevated temperature at least sufficient to effect substantial isomerization and not in excess of about 300° F., the height of said liquid catalyst column being such that substantial isomerization occurs in a single passage of feed hydrocarbons through the column, maintaining the volume of liquid catalyst in the column substantially greater than the volume of hydrocarbons undergoing treatment therein, maintaining the top of said catalyst column below the point of isomerized hydrocarbon discharge from the reaction zone, continuously removing from the top of said liquid catalyst column within the reaction zone a hydrocarbon phase containing isomerized hydrocarbons which is substantially free from dissolved metallic halide, introducing metallic halide to said catalyst column, and regulating the amount so introduced such that the complex is maintained at a predetermined level of activity and is characterized by having an absolute heat of hydrolysis in the range from substantially above 213 to about 341 calories per gram of complex.

2. The method according to claim 1 in which the metallic halide is introduced as a solution in a stream of feed hydrocarbon entering the reaction zone.

3. A continuous method of isomerizing saturated hydrocarbons which comprises maintaining within a vertical reaction zone a substantially static column of liquid catalyst consisting essentially of complex formed by reacting aluminum chloride in the presence of hydrogen halide with hydrocarbons which are substantially free from aromatic constituents, continuously introducing feed hydrocarbon to the lower portion of said zone, passing the introduced hydrocarbons comprising $C_4$ hydrocarbons in dispersed liquid phase upwardly through the liquid column by difference in density in the presence of a small amount of hydrogen halide at an elevated temperature at least sufficient to effect substantial isomerization and not in excess of about 300° F., the height of said liquid catalyst column being such that substantial isomerization occurs in a single passage of feed hydrocarbons through the column, maintaining the volume of liquid catalyst in the column substantially greater than the volume of hydrocarbons undergoing treatment therein, maintaining the top of said catalyst column below the point of isomerized hydrocarbon discharge from the reaction zone, continuously removing from the top of said liquid catalyst column within the reaction zone a hydrocarbon phase containing isomerized hydrocarbons which is substantially free from dissolved aluminum chloride, introducing aluminum chloride to feed hydrocarbons passing to said catalyst column, and regulating the amount so introduced such that the complex is maintained at a predetermined level of activity and is characterized by having an absolute heat of hydrolysis substantially above 213 but not substantially greater than 341 calories per gram of complex and being substantially free from solids.

4. A continuous method of isomerizing normal butane which comprises maintaining within a vertical reaction zone a substantially static column of liquid catalyst consisting essentially of complex formed by reacting aluminum chloride in the presence of hydrogen chloride with hydrocarbons which are substantially free from aromatic constituents, continuously introducing normal butane to the lower portion of said zone, passing the introduced butane in dispersed liquid phase upwardly through the liquid column by difference in density in the presence of hydrogen chloride at a temperature in the range about 180 to 240° F., the height of said liquid catalyst column being such that substantial isomerization occurs in a single passage of normal butane through the column, maintaining the volume of liquid catalyst in the column substantially greater than the volume of hydrocarbons undergoing treatment therein, maintaining the top of said catalyst column below the point of isobutane discharge from the reaction zone, continuously removing from the top of said liquid catalyst column within the reaction zone a hydrocarbon phase containing isobutane which is substantially free from dissolved aluminum chloride, introducing aluminum chloride to a stream of normal butane passing to the reaction zone, and regulating the amount so introduced such that the complex is maintained at predetermined level of activity and is characterized by having an absolute heat of hydrolysis of about 320 to 341 calories per gram of complex and is substantially free from solids.

5. A continuous method of isomerizing saturated hydrocarbons which comprises maintaining within a vertical reaction zone a substantially static column of liquid catalyst consisting essentially of complex formed by reacting aluminum halide in the presence of hydrogen halide with hydrocarbons which are substantially free from aromatic constituents, continuously introducing feed hydrocarbon to the lower portion of said zone, passing the introduced hydrocarbons comprising C4 hydrocarbons in dispersed liquid phase upwardly through the liquid column by difference in density in the presence of hydrogen halide amounting to not in excess of about 5% by weight of feed hydrocarbons and at an elevated temperature at least sufficient to effect substantial isomerization and not in excess of about 300° F., the height of said liquid catalyst column being such that substantial isomerization occurs in a single passage of feed hydrocarbons through the column, maintaining the volume of liquid catalyst in the column substantially greater than the volume of hydrocarbons undergoing treatment therein, continuously removing from the top of said liquid catalyst column within the reaction zone a hydrocarbon phase containing isomerized hydrocarbons which is substantially free from dissolved aluminum halide, introducing aluminum halide to said catalyst column, and regulating the amount so introduced such that the complex is maintained at a predetermined level of activity and is characterized by having an absolute heat of hydrolysis substantially above 213 and not substantially exceeding about 341 calories per gram of complex.

6. A continuous method of isomerizing saturated hydrocarbons which comprises disposing in a vertical reaction zone a substantially static column of liquid catalyst consisting essentially of complex formed by reacting aluminum halide in the presence of hydrogen halide with aliphatic hydrocarbons substantially free from aromatic constituents, said complex having a predetermined isomerizing activity and being characterized by having an absolute heat of hydrolysis of about 320 to 341 calories per gram of complex and being substantially free from solids, continuously introducing normal butane to the lower portion of said zone, passing the introduced hydrocarbons in dispersed liquid phase upwardly through the liquid column by difference in density in the presence of hydrogen halide amounting to not in excess of about 5% by weight of normal butane and at an elevated temperature at least sufficient to effect substantial isomerization and not in excess of about 300° F., the height of said liquid catalyst column being such that substantial isomerization occurs in a single passage of feed hydrocarbons through the column, continuously removing from the top of said liquid catalyst column within the reaction zone a hydrocarbon phase containing isomerized hydrocarbons which is substantially free from dissolved aluminum halide, introducing aluminum halide to the catalyst column and regulating the amount so introduced such that the complex catalyst is maintained at substantially said predetermined activity and of the aforesaid character.

7. A continuous method for isomerizing normal butane which comprises disposing in a vertical reaction zone a substantially static column of liquid catalyst consisting essentially of AlCl3-aliphatic hydrocarbon complex said complex having a predetermined isomerizing activity and being characterized by having an absolute heat of hydrolysis of about 320 to 341 calories per gram of complex, continuously introducing normal butane to the lower portion of said zone, passing the introduced butane in dispersed liquid phase upwardly through the liquid column by difference in density in the presence of hydrogen chloride amounting to not in excess of about 5% by weight of butane and at an elevated temperature at least sufficient to effect substantial isomerization and not in excess of about 300° F. the height of said liquid catalyst column being such that substantial isomerization occurs in a single passage of butane through the column, continuously removing from the top of said liquid catalyst column within the reaction zone a hydrocarbon phase containing isobutane and unreacted normal butane, said hydrocarbon phase being substantially free from dissolved aluminum halide, fractionating said removed hydrocarbon phase into a fraction comprising essentially isobutane and a fraction comprising essentially normal butane, discharging said isobutane fraction, recycling said normal butane fraction at least in part as hydrocarbon feed to the reaction zone, introducing aluminum chloride to the catalyst column and regulating the amount of aluminum chloride so introduced such that the complex catalyst is maintained at substantially said predetermined activity and of the aforesaid character.

8. A continuous method for isomerizing normal butane which comprises passing a stream of hydrocarbons comprising normal butane in liquid phase in contact with a mass of liquid catalyst disposed within a reaction zone, said catalyst consisting essentially of complex catalyst formed by reacting aluminum chloride with aliphatic hydrocarbons in the presence of hydrogen chloride at elevated temperature and having an absolute heat of hydrolysis in the range of substantially above 213 to about 341 calories per gram of complex at which the catalyst has high isomerizing activity, effecting said contact at a temperature in the range about 180 to 240° F. in the presence of hydrogen chloride amounting to not in excess of about 5% by weight of feed hydrocarbons such that substantial isomerization occurs, continuously removing from the reaction zone a stream of hydrocarbon phase containing a substantial proportion of isobutane and relatively free from dissolved aluminum chloride, and adding aluminum chloride in solution in a portion of the feed hydrocarbons to maintain the complex catalyst at substantially said predetermined activity and of the aforementioned character.

9. A continuous method for isomerizing normal butane which comprises maintaining within a vertical reaction zone a substantially static column of liquid catalyst consisting essentially of complex formed by reacting aluminum chloride with aliphatic hydrocarbons in the presence of hydrogen chloride at elevated temperature and having an absolute heat of hydrolysis of at least 213, and not substantially exceeding about 341 calories per gram of complex, continuously introducing a hydrocarbon stream comprising normal butane to the lower portion of said zone, passing the introduced hydrocarbons in dispersed liquid phase upwardly through the liquid column by difference in density in the presence of hydrogen chloride amounting to not in excess of about 5% by weight of normal butane and at a temperature in the range about 180 to 240° F. such that substantial isomerization occurs, continuously removing from the upper portion of said reaction zone a stream of hydrocarbon phase containing isomerized hydrocarbons relatively free from dissolved aluminum chloride, and adding aluminum chloride to the complex liquid at a controlled rate to maintain the said isomerization activity and the said absolute heat of hydrolysis range of the liquid catalyst.

WILLIAM R. SMITH.